United States Patent [19]

Naarmann et al.

[11] Patent Number: 4,927,578

[45] Date of Patent: May 22, 1990

[54] METHOD FOR PRODUCING UNCROSSLINKED POLYACETYLENE FILM

[75] Inventors: Herbert Naarmann, Wattenheim; Nicolas Theophilou, Philadelphia, both of Pa.

[73] Assignee: BASF Aktiengesellschaft, Ludwigshafen, Fed. Rep. of Germany

[21] Appl. No.: 195,663

[22] Filed: May 18, 1988

[30] Foreign Application Priority Data

May 21, 1987 [DE] Fed. Rep. of Germany ....... 3717067

[51] Int. Cl.⁵ .................... B29C 41/08; B05D 3/04
[52] U.S. Cl. .................... 264/81; 264/331.17; 427/171; 427/255.6; 427/301
[58] Field of Search ............ 264/81, 331.17; 526/901, 151, 348.1; 427/171, 255.6, 301

[56] References Cited

U.S. PATENT DOCUMENTS

| | | | |
|---|---|---|---|
| 4,356,301 | 10/1982 | Gleim | 528/487 |
| 4,510,075 | 4/1985 | Lee et al. | 524/80 |
| 4,553,919 | 11/1985 | Hide | 526/901 |
| 4,631,205 | 12/1986 | Eveleigh | 427/302 |
| 4,672,093 | 6/1987 | Wnek et al. | 525/356 |
| 4,675,137 | 6/1987 | Umetsu | 264/81 |

FOREIGN PATENT DOCUMENTS

| | | |
|---|---|---|
| 0036118 | 5/1985 | European Pat. Off. |
| 88301 | 10/1985 | European Pat. Off. |
| 3120441 | 12/1982 | Fed. Rep. of Germany |
| 3143868 | 5/1983 | Fed. Rep. of Germany |
| 3207857 | 9/1983 | Fed. Rep. of Germany |
| 3614502 | 11/1987 | Fed. Rep. of Germany |

OTHER PUBLICATIONS

Shirakawa et al., Journal of Polymer Science: Polymer Chemistry Edition, vol. 12, pp. 11–20, 1974.
Naarmann, Die Angewandte Makromolekulare Chemie 109/110 (1982), pp. 295–338.

*Primary Examiner*—James Lowe
*Attorney, Agent, or Firm*—Keil & Weinkauf

[57] ABSTRACT

Virtually uncrosslinked polyacetylenes in film form are prepared by polymerization of acetylene using a liquid catalyst system consisting of an organicaluminum compound and a titanate in the form of a solution in a viscous inert liquid on a substrate to which the catalyst solution is applied, by a process in which, after the polymerization, the polymer is treated with a strong reducing agent which is inert to the organoaluminum catalyst component, the polymer is, if desired, oriented and is freed from residual catalyst and reducing agent by washing with a liquid, doped with a strong electron acceptor or electron donor in a conventional manner to increase the conductivity and dried, and the materials thus obtained are, if desired, covered with a layer or sheath of nonconductive material.

30 Claims, No Drawings

METHOD FOR PRODUCING UNCROSSLINKED POLYACETYLENE FILM

The present invention relates to a process for the preparation of virtually uncrosslinked polyacetylenes in film form by polymerization of acetylene using a liquid catalyst system consisting of an organic aluminum compound and a titanate in the form of a solution in a viscous inert liquid on a substrate, to which the catalyst solution is applied.

The present invention furthermore relates to composite materials consisting of a fibrous or sheet-like, nonconductive substrate and the acetylene polymer applied thereon.

Shirawaka et al. disclose that the polymerization of acetylene using organotitanium and organoaluminum compounds as a catalyst system in toluene at −76° C. gives polyacetylene films having good mechanical strength (cf. for example J. Polym. Sci., Poly. Chem. Ed. 12 (1974), 11–20.

EP-A No. 88 301 discloses a process for the preparation of polyacetylene films which have good mechanical strength and are sufficiently thick, in which a catalyst system consisting of an organoaluminum compound and an organotitanium compound in a solvent having a certain viscosity is used. This catalyst solution is employed for the preparation of polyacetylene films on solid substrates.

Polyacetylene films of this type can be doped with conventional dopants, for example with iodine or arsenic pentafluoride, in order to increase the conductivity.

However, the processes described are not very useful industrially because the films obtained have very different thicknesses and resulting disadvantages such as inadequate transparency and reproducibility as well as poor mechanical stability during processing.

Furthermore, DE-A No. 31 20 441, DE-A No. 31 43 868, DE-A No. 32 07 857 and DE-A No. 36 14 502 disclose the use of substrates of metal, plastic films, glass and fibers (in the form of woven fabrics or nets).

However, in the processes described above, only relatively poor conductivities are achievable because either the substrates cannot be oriented or the films can no longer be removed from the substrate.

We have also found that the known processes for the preparation of polyacetylene films lead to polymers which exhibit marked crosslinking and therefore have inadequate conductivities even after doping with conductivity improvers.

It is an object of the present invention to prepare homogeneous, virtually uncrosslinked, mechanically strong, highly conductive polyacetylenes, which may be transparent, in the form of films of sufficient thickness or in combination with suitable substrates as composites.

We have found that this object is achieved by a process for the preparation of virtually uncrosslinked polyacetylenes in film form by polymerization of acetylene using a liquid catalyst system consisting of an organic aluminum compound and a titanate in the form of a solution in a viscous inert liquid on a substrate to which the catalyst solution is applied, wherein, after the polymerization, the polymer is treated with a strong reducing agent which is inert to the organoaluminum catalyst component, the polymer is, if desired, oriented and is freed from residual catalyst and reducing agent by washing with a liquid, doped with a strong electron acceptor or electron donor in a conventional manner to increase the conductivity and dried, and the materials thus obtained are, if desired, covered with a layer or sheath of nonconductive material.

In the novel process, the acetylene can be polymerized at from −10° to 100° C., in particular from 10° to 50° C.

The polymerization is advantageously carried out in an inert gas atmosphere, for example under argon or nitrogen.

Suitable organic aluminum compounds are alkyl compounds of the type

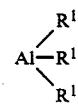

where the radicals $R^1$ are identical or different $C_1$–$C_{20}$-alkyl groups, preferably $C_1$–$C_5$-alkyl groups, the ethyl group being particularly preferred.

Suitable titanates are all titanium(III) and titanium-(IV) compounds of the type $Ti(OR^2)_4$ and $Ti(OR^2)_3$, where the radicals $R^2$ are identical or different alkyl groups of 1 to 20, preferably 4 to 12, carbon atoms; the butyl group is particularly preferred.

The catalyst system is described in more detail in DE-A No. 29 12 572 and the publication by H. Naarmann, Angewandte Macromolekulare Chemie 109/110 (1982), 295–338.

The ratio of the aluminum compound to the titanium compound is preferably from 0.5:1 to 2:1, preferably 1:1.

Both components are dissolved in an inert viscous solvent whose viscosity is preferably from 5 to 50,000, in particular from 1,000 to 45,000, mPa.s (measured at 20° C. using a Haake rotational viscometer VD 180).

Examples of suitable solvents of this type are silicone oils, polyisobutenes and polybutadienes, the molecular weight of the polymers being from 3,000 to 100,000, preferably from 5,000 to 30,000. It is particularly preferable to add silicone oil in the novel process, the amount preferably being from 20 to 80% by weight.

It is particularly advisable to heat the catalyst system before use in a viscous solvent for about 20–100 min to 100°–200° C.

This results in the formation of the highly active Al/Ti complex. All operations are advantageously carried out under an inert gas, e.g. argon, since the catalysts are very sensitive to oxidation.

To carry out the novel process, the catalyst solution is applied to the substrate under an inert gas atmosphere, after which the inert gas atmosphere is replaced by an acetylene atmosphere, under which the polymerization takes place. It is advantageous to carry out this procedure in an evacuatable container.

The polyacetylene films are produced on substrates. Particularly suitable substrates are the materials stated in the literature cited at the outset, such as metals, metal foils and preferably films of nonconductive plastics, such as polyamides, polyesters and polyolefins based on polyethylene, polypropylene or polybutadiene.

Other preferred substrates are fibers and belts of nonconductive plastics, such as polyacrylonitrile, natural rubber, silk and the abovementioned plastics, which may already have been oriented prior to the polymerization.

The diameter of the fibers, which are preferably arranged parallel, is from 0.1 to 100 μm, preferably from 0.1 to 50 μm.

Bodies whose lateral surfaces can, if desired, be converted to a flat surface are, for example, cylinders.

An essential feature of the invention is the addition of from 0.01 to 10, preferably from 0.01 to 1%, by weight of a reducing agent after the polymerization is complete. In general, suitable reducing agents are all those which do not react with the organoaluminum component of the catalyst system, ie. the abovementioned aluminum alkyls themselves.

Suitable reducing agents are in general the metals or preferably the organometallic compounds from the groups IA, IB, IIA, IIB, IIIA and IIIB of the Periodic Table.

Examples of particularly suitable substances are copper complexes, silver complexes and gold complexes, zinc alkyls, cadmium alkyls and mercury alkyls as well as ether complexes of the metals of groups IA, IIA and IIIB of the Periodic Table. Other suitable substances are cesium and its alkyl and aryl compounds, mixtures of organometallic compounds, for example of zinc alkyls with magnesium alkyls, and alkyls or aryls of yttrium or lanthanum, as well as lithium alkyls in combination with zirconium halides, tungsten halides and titanium tetrabenzyl.

Examples of suitable reducing agents are:
borane dimethyl sulfide
lithium aluminum hydride
diethylberyllium
tributylboron
tri-sec-butylboron
triethylboron
triphenylboron
allyllithium
n-butyllithium
sec-butyllithium
tert-butyllithium
cyclopentadienyllithium
phenyllithium
propynyllithium
triphenylsilyllithium
bicyclopentadienylmagnesium
diallylmagnesium
dibutylmagnesium
diethylmagnesium
di-n-hexylmagnesium
bis-(triphenylphosphine)-nickel(II) bromide
bis-(triphenylphosphine)-nickel dicarbonyl
bis-(triphenylphosphite)-nickel dicarbonyl
tetrakis-(triethylphosphine)-nickel
naphthalinepotassium or naphthalinesodium
anthracenepotassium or anthracenesodium
sodium suspensions in toluene.

As a result of the treatment of the polymeric films with the reducing agent, the polymers tend to undergo substantially less crosslinking after the catalyst has been washed out, so that the conductivity does not decrease. The exact reason for this effect is not yet known, but it may be assumed that the reducing agent deactivates active centers which effect crosslinking.

To achieve even higher electrical conductivities, the novel polyacetylenes are oriented, that is, stretched in one direction. For this purpose, the polyacetylene film can either be removed from the substrate or, depending on the intended use, can be oriented on the substrate. The electrical conductivity increases steadily with increasing stretching ratio. The stretching ratio is the ratio $$s = \frac{L - L_0}{L_0}$$

where $L_0$ is the initial length of the polyacetylene film and L is the length of the polyacetylene film after stretching is complete.

The achievable stretching rate depends on the one hand on the polyacetylene films and their mechanical properties and on the other hand on the substrate used. In general, stretching rates of up to 600%, preferably from 100 to 550%, can be achieved. With stretching rates in the region of about 300%, it is possible to achieve electrical conductivities of from 100,000 to more than 1 million S/cm.

Simultaneously with the increase in the conductivity in the stretching or orientation direction, a decrease in the electrical conductivity at right angles to the direction is observed. Thus electrical conductivity becomes anisotropic. The anisotropy factor, or the ratio of the electrical conductivity in the orientation direction to that at right angles to the orientation direction, is in general from 3 to 20, in particular from 5 to 15. As a rule of thumb, it may be stated that the conductivity in the orientation direction is about one order of magnitude higher than that at right angles to the orientation direction.

The residual catalyst and reducing agent can be washed out before or after the orientation process. However, the residues are preferably washed out after the orientation procedure since this gives virtually uncrosslinked polyacetylene films which, as a result of the small number of crosslinking centers, possess a higher conductivity after doping.

Washing out can be effected, for example, with toluene or hydrogen chloride-containing methanol, the catalyst residues being removed from the polyacetylene film. For this purpose, the polyacetylenes are usually washed for from 1 to 6 hours in toluene or in another solvent and/or for from 8 to 24 hours with hydrogen chloride-containing methanol.

The 100:2 (v/v) mixture of methanol and glacial acetic acid is particularly preferred, the mixture permitting the residues to be washed out quantitatively in the course of 1 hour. Drying is then carried out under an inert gas, and may be effected under reduced pressure.

Thereafter, the polyacetylene is doped with known dopants by a conventional method, electron donors or electron acceptors being used to increase the conductivity.

The doping methods are described in the literature, and in this context reference may be made in particular to EP-A No. 36 118. Iodine and arsenic pentafluoride have proven to be preferable as dopants. In principle, however, it is possible to use all dopants listed in EP-A No. 36 118.

The novel process gives highly conductive polyacetylenes having conductivities of from 20,000 to several million S/cm. Polyacetylenes of this type thus have conductivities which are in the range of the conductivities of metals.

Moreover, the acetylene polymers have film thicknesses which are sufficiently mechanically stable and are furthermore transparent. The films can be produced with high reproducibility in terms of quality and are easy to handle during processing.

The highly conductive polyacetylenes obtained according to the invention can be used, for example, as electrical conductors, polarizers or light filters, in switches, or as reflectors, sensors or screening material.

EXAMPLES

Examples 1 to 5

Preparation of polyacetylene films

Example 1

All work was carried out in a nitrogen atmosphere. The catalyst system consisted of:
50 ml of silicone oil AV 1000 (viscosity: 10,000 mPa.s),
15 g of triethylaluminum (TEA) and
25 g of tetrabutoxy titanate.

The catalyst system was prepared in a conventional manner.

7 ml of the catalyst solution were applied to a polyethylene film having a length of 30 cm, a width of 30 cm and a thickness of 20 μm in an evacuatable container.

The container was evacuated, after which 600 ml of gaseous acetylene was passed in over a period of 20 minutes. A black homogeneous film was obtained and was treated with 0.7 ml of n-butyllithium in the form of a 16.5% strength by weight solution in n-hexane as a reducing agent. The film was then removed from the substrate and washed with toluene, dried, and doped in a conventional manner with $I_2$ in $CCl_4$.

Properties of the film:
(a) C is fractions of the polymer chains in the film according to analysis by infrared spectroscopy: 80%
(b) Conductivity of the film before doping: $10^{-8}$ s/cm.
(c) $sp^3$-hybridized carbon (carbon which is not olefinically bonded) according to $C^{13}$ nuclear resonance spectroscopy (CXP 200 Brucker): 0%
(d) Crystallinity (Phillips diffractometer, $CuK_\alpha$ X-radiation): 65%.
(e) The amounts of Al, Ti and Si were less than 0.05%.
(f) Iodine content after doping: 70% by weight.
(g) Conductivity after doping: 2,000 S/cm.

Example 2

The film obtained in Example 1, which still contained the catalyst and the reducing agent, was stretched to 550%, washed and doped.

The conductivity was 18,000 S/cm.

Example 3

The procedure was similar to that of Example 1, except that the film was washed and then stretched to 550%.

The conductivity was 2,000 S/cm.

Example 4

The procedure was similar to that of Example 2, except that the amounts of the reducing agent n-butyllithium used were changed. Toluene was used as the wash solvent.

TABLE 1

| No. | Amount [ml](*) | Stretching rate [%] | Conductivity [S/cm] |
|---|---|---|---|
| 1 | 1 | 400 | 46,850 |
| 1$^a$ | 1 | — | 3,000 |
| 2 | 2 | 400 | 120,000 |
| 2$^a$ | 2 | — | 5,000 |
| 3 | 3 | 400 | 170,000 |
| 3$^a$ | 3 | — | 34,000 |

(*)Based on 10 ml of catalyst system
$^a$For comparison

Example 5

The procedure described in Example 4 was followed, except that, instead of n-butyllithium, other reducing agents were used.

TABLE 2

| No. | Reducing agent | Amount [ml](*) | Conductivity [S/cm] |
|---|---|---|---|
| 4 | sec-butyllithium | 3 | 125,000 |
| 5 | tert-butyllithium | 3 | 118,000 |
| 6 | propyllithium | 3 | 108,000 |
| 7 | dibutylmagnesium | 3 | 95,000 |
| 8 | sodium suspension, 12% strength in toluene | 5 | 114,000 |
| 9 | bis-(triphenylphosphine)-nickel dicarbonyl | 3 | 93,000 |

(*)Based on 10 ml of catalyst system.

Examples 6 To 13

Preparation of laminated films

Example 6

All work was carried out in an argon atmosphere.
A solution of
15 g of triethylaluminum (TEA),
21 g of tetrabutoxy titanate (IV) and
30 ml of silicone oil having a viscosity of 15,000 mPa.s
was prepared in a conventional manner, as the catalyst system.

10 ml of this catalyst solution were applied to a polypropylene film having a length of 30 cm, a width of 30 cm and a thickness of 20 μm.

The container was evacuated, after which 600 ml of gaseous acetylene purified in a conventional manner were metered in over 6 minutes.

A green homogeneous polyacetylene film was formed on the surface of the polypropylene film, the said polyacetylene film subsequently being treated with 1.2 g of dibutylmagnesium in 10 ml of n-hexane. The laminated film was left for 20 minutes in the reactor and then stretched to 600%. The oriented laminated film was freed from residual catalyst and reducing agent by washing with toluene and was dried.

The laminated film was doped with a saturated solution of $I_2$ in $CCl_4$. Washing with $CCl_4$ and drying were followed by measurement of the conductivity for 4 samples. A mean value of 85,000 S/cm was obtained.

Example 7 (for comparison)

A polyacetylene film prepared similarly to Example 6 but without the addition of a reducing agent was washed by the procedure described in Example 6, immediately after preparation, so that the catalyst residues were removed. The film was then oriented to 600%. Thereafter, doping was carried out as stated above. The conductivity of the doped film was 7,500 S/cm.

Example 8

The procedure described in Example 6 was followed, except that the substrate film used was a 20 μm thick polyethylene film. The polyacetylene film containing residual catalyst and reducing agent was oriented to 500%. After washing and doping, a conductivity of 110,000 S/cm was measured.

Example 9

The procedure described in Example 6 was followed, except that, instead of dibutylmagnesium, a mixture of dibutylzinc and n-butyllithium was used as the reducing agent. After orientation, washing out of the catalyst and reducing agent and doping, a conductivity of 156,000 S/cm was measured.

When the film was not oriented, a conductivity of 7,500 S/cm was determined.

When no reducing agent was added and the catalyst residues were removed by washing directly after the polymerization, and the film was then oriented and doped, a conductivity of 8,000 S/cm was measured.

Example 10

Instead of dibutylmagnesium, a mixture of dibutylmagnesium and allylnickel was used as the reducing agent. The conductivity of the polyacetylene film prepared according to the procedure of Example 6 was 250,000 S/cm.

Example 11

The procedure described in Example 6 was followed, except that the film was provided with catalyst on both sides of the substrate and then gassed with acetylene. The product obtained had, on both sides, a conductivity of 950,000 S/cm, this being the mean value of 8 measurements.

Example 12

The procedure described in Example 6 was followed, except that a high density polyethylene film was used as the substrate. The reducing agent was n-butyllithium. The film was oriented to 500%. The conductivity of the film after washing and doping was 6,000 S/cm.

Example 13

The procedure described in Example 12 was followed, except that washing was carried out prior to orientation. The stretching rate was 670%. The film had a conductivity of 8,000 S/cm.

Examples 14 To 16

Production of composite fibers

Example 14

Various substrate fibers of nonconductive material were covered with a polyacetylene film using the procedure described in Example 6 (see Table 3).

TABLE 3

| Substrate fiber | Diameter [μm] | Conductivity* S/cm | Stretching rate [%] | Reducing agent |
|---|---|---|---|---|
| Polypropylene | 1 | 200,000 (10) | 600 | dibutylmagnesium |
| Polypropylene(a) | 1 | 65,000 (4) | 600 | — |
| Polypropylene | 1 | 156,000 (4) | 600 | dibutylzinc/n-butyllithium |
| Polypropylene(b) | 1 | 7,500 (4) | — | — |
| Polypropylene(b) | 1 | 8,000 (4) | 600 | dibutylzinc/n-butyllithium |
| Polypropylene | 1 | 200,000 (4) | 600 | dibutylmagnesium/tetrakis (triethylphosphine) nickel (O) |
| Polyester | 2 | 150,000 (5) | 500 | dibutylmagnesium |
| Nylon 6.6 | 0.5 | 75,000 (5) | 250 | dibutylmagnesium |
| Polyisoprene | 100 | 80,000 (5) | 280 | dibutylmagnesium |
| Natural rubber | 80 | 150,000 (5) | 450 | dibutylmagnesium |
| Silk | 0.7 | 120,000 (5) | 180 | dibutylmagnesium |

*The number of measurements for determining the conductivity is stated in parentheses.
(a)The coated fiber was first washed and then oriented.
(b)For comparison

Example 15

The catalyst system from Example 6 additionally contained 5 g of polybutadiene (molecular weight 450,000) as a viscosity-increasing additive.

1.3 ml of n-butyllithium in the form of a 16.5% strength by weight solution in n-hexane was used as the reducing agent. In order to improve the reproducibility of the polyacetylene film thickness, the fibers were clamped and fastened in a stainless steel cylinder, consisting of a core and sleeve, in such a way that they were arranged parallel. This procedure permitted better reproduction of the conductivities of the doped composite fibers.

The wash solvent was methanol/glacial acetic acid in a ratio of 100:2.

The thickness of the polyacetylene film polymerized on was determined by electron microscopy.

TABLE 4

| Various composite fibers and their electrical conductivity | | | |
|---|---|---|---|
| Fiber type | Fiber diameter [μm] | Electrical conductivity [S/cm] | Stretching rate [%] | Thickness of the (CH) × film [μm] |
| Nylon 6.6 | 30 | 120,000 | 300 | 1.2 |
| Nylon 6.6 | 45 | 16,000 | 450 | 1.1 |
| Nylon 6.12 | 30 | 15,000 | 300 | 2.5 |
| Polyester 1 | 25 | 10,000 | 300 | 2.0 |
| Polyester 2 | 25 | 8,000 | 100 | 1.9 |
| Polypropylene | 50 | 57,000 | 600 | 0.4 |
| Polyacrylo- | 20 | 63,000 | 800 | 0.3 |

TABLE 4-continued

Various composite fibers and their electrical conductivity

| Fiber type | Fiber diameter [μm] | Electrical conductivity [S/cm] | Stretching rate [%] | Thickness of the (CH) × film [μm] |
|---|---|---|---|---|
| nitrile | | | | |

Polyester 1 consists of polyethylene terephthalate
Polyester 2 consists of polyethylene terephthalate

Example 16

Preparation of a composite fiber whose core of nonconductive material has already been oriented before the polymerization A fiber bundle of polyethylene terephthalate was oriented to 750% at 60° C. and then cooled under greatly reduced pressure. The fiber bundle was treated with catalyst solution using the procedure in Example 6, 30 ml of catalyst solution being used per 100 g of fibers.

The conductivity of a single fibrid after doping was 2,600 S/cm.

We claim:

1. A process for preparing a virtually uncrosslinked polyacetylene in film form, which comprises: polymerizing acetylene using a liquid catalyst system containing an organic aluminum compound and a titanate, in the form of a solution in a viscous inert liquid on a substrate to which the catalyst solution is applied, to form a polymer and treating the polymer with a strong reducing agent which is inert to the organoaluminum catalyst component, wherein the polymer is: oriented, freed from a residual catalyst and reducing agent by washing with a liquid, doped with a strong electron acceptor or electron donor in a conventional manner and dried.

2. The process of claim 1, wherein the amount of reducing agent added is from 0.01 to 1.0% by weight, based on the amount of the components of the catalyst system.

3. The process of claim 1, wherein the catalyst system is heated before being applied to the substrate.

4. The process of claim 1, wherein the viscous, chemically inert solvent used is one which has a viscosity of from 5 to 50,000 mPa.s.

5. The process of claim 1, wherein the film, is oriented and washed before the drying and doping steps.

6. A process for preparing a polyacetylene film, which comprises the steps of:

(a) preparing a catalyst solution containing an organic aluminum compound, a titanate and an inert solvent;
(b) applying the catalyst solution to a substrate;
(c) polymerizing acetylene over the catalyst solution and substrate at from −10° to 100° C. to form a polyacetylene film;
(d) treating the polyacetylene film with a reducing agent, wherein the reducing agent is inert to the organoaluminum compound and is added at from 0.01 to 10% by weight based on the amount of catalyst system components;
(e) stretching the polyacetylene film;
(f) washing the polyacetylene film after the polyacetylene film has been stretched;
(g) drying the polyacetylene film under an inert gas; and
(h) doping the polyacetylene film with electron donors or electron acceptors.

7. The process of claim 6, wherein the acetylene is polymerized at from 10° to 50° C.

8. The process of claim 6, wherein the catalyst solution is applied to the substrate under an inert gas atmosphere which is replaced by an acetylene atmosphere.

9. The process of claim 6, wherein the substrate is a film of nonconductive plastic selected from the group consisting of polyamides, polyesters and polyolefins.

10. The process of claim 6, wherein the substrate comprises fibers of a nonconductive plastic.

11. The process of claim 10, wherein the fibers of the substrate are parallel to each other and have a diameter of from 0.1 to 100 μm.

12. The process of claim 11, wherein the fibers have a diameter of from 0.1 to 50 μm.

13. The process of claim 6, wherein the reducing agent added is from 0.01 to 1% by weight.

14. The process of claim 8, wherein the polyacetylene film is washed with a 100:2(v/v) mixture of methanol and glacial acetic acid.

15. The process of claim 6, further comprising orienting the polyacetylene film by stretching the film in one direction.

16. The process of claim 15, wherein the polyacetylene film has a stretching ratio of up to 600%.

17. The process of claim 16, wherein the polyacetylene film has a stretching ratio of from 100 to 550%.

18. The process of claim 17, wherein the stretching ratio is about 300%.

19. The process of claim 6, wherein the organic aluminum compounds are compounds of the type:

where the radicals $R^1$ are identical or different $C_1$–$C_{20}$ alkyl groups.

20. The process of claim 19, wherein the radicals $R^1$ are $C_1$–$C_5$ alkyl groups.

21. The process of claim 20, wherein the radicals $R^1$ are an ethyl group.

22. The process of claim 6, wherein the titanates are selected from the group consisting of titanium (III) or titanium (IV) compounds of the type $Ti(OR^2)$ and $Ti(OR^2)_4$, where the radicals $R^2$ are identical or different alkyl groups having 1 to 20 carbon atoms.

23. The process of claim 22, wherein the radical $R^2$ has 4 to 12 carbon atoms.

24. The process of claim 23, wherein the radical $R^2$ is butyl.

25. The process of claim 6, wherein the ratio of the organic aluminum compound to the titanate is 0.5:1.

26. The process of claim 25, wherein the ratio of the organic aluminum compound to the titanate is 1:1.

27. The process of claim 6, wherein the viscosity of the inert solvent is 5 to 50,000 mPa.s measured at 20° C.

28. The process of claim 27, wherein the viscosity of the inert solvent is 1,000 to 45,000 mPa.s.

29. The process of claim 28, wherein the solvent is silicone oil in an amount of 20 to 80% by weight.

30. The process of claim 6, wherein the catalyst system is heated for about 20 to 100 minutes to 100°–200° C. before it is applied to the substrate.

* * * * *